US011544810B2

(12) United States Patent
Rao et al.

(10) Patent No.: US 11,544,810 B2
(45) Date of Patent: Jan. 3, 2023

(54) PREDICTIVE INVENTORY AVAILABILITY

(71) Applicant: Maplebear, Inc., San Francisco, CA (US)

(72) Inventors: Sharath Rao, San Francisco, CA (US); Shishir Prasad, Fremont, CA (US); Jeremy Stanley, Oakland, CA (US)

(73) Assignee: Maplebear Inc., San Francisco, CA (US)

( * ) Notice: Subject to any disclaimer, the term of this patent is extended or adjusted under 35 U.S.C. 154(b) by 1292 days.

(21) Appl. No.: 15/885,492

(22) Filed: Jan. 31, 2018

(65) Prior Publication Data

US 2019/0236740 A1 Aug. 1, 2019

(51) Int. Cl.
*G06Q 50/28* (2012.01)
*G06Q 10/06* (2012.01)
*G06Q 10/08* (2012.01)

(52) U.S. Cl.
CPC ........... *G06Q 50/28* (2013.01); *G06Q 10/067* (2013.01); *G06Q 10/06315* (2013.01); *G06Q 10/087* (2013.01)

(58) Field of Classification Search
CPC ............. G06Q 50/28; G06Q 10/06315; G06Q 10/067; G06Q 10/087
See application file for complete search history.

(56) References Cited

U.S. PATENT DOCUMENTS 9,741,007 B1 * 8/2017 Rouaix ................. G06Q 20/20
10,163,070 B1 * 12/2018 Phillips .............. G06Q 10/0834
10,242,336 B1 * 3/2019 Agarwal .............. G06Q 10/083
10,387,795 B1 * 8/2019 Oldridge ................... G06N 5/04
10,438,164 B1 * 10/2019 Xiong ....................... H04N 7/18
10,748,072 B1 * 8/2020 Seeger ................... G06N 7/005
(Continued)

FOREIGN PATENT DOCUMENTS

WO WO-2017223298 A2 * 12/2017 ............. F25D 29/00

OTHER PUBLICATIONS

R. Kutzelnigg, "Optimal allocation of goods in a warehouse: Minimizing the order picking costs under real-life constraints," 3rd IEEE International Symposium on Logistics and Industrial Informatics, 2011, pp. 65-70, doi: 10.1109/LINDI.2011.6031164. (Year: 2011).*

*Primary Examiner* — Shelby A Turner
(74) *Attorney, Agent, or Firm* — Fenwick & West LLP

(57) ABSTRACT

A method for predicting inventory availability, involving receiving a delivery order including a plurality of items and a delivery location, and identifying a warehouse for picking the plurality of items. The method retrieves a machine-learned model that predicts a probability that an item is available at the warehouse. The machine-learned model is trained, using machine learning, based in part on a plurality of datasets. The plurality of datasets include data describing items included in previous delivery orders, whether each item in each previous delivery order was picked, a warehouse associated with each previous delivery order, and a plurality of characteristics associated with each of the items. The method predicts the probability that one of the plurality of items in the delivery order is available at the warehouse, and generates an instruction to a picker based on the probability. An instruction is transmitted to a mobile device of the picker.

20 Claims, 7 Drawing Sheets

(56) References Cited

U.S. PATENT DOCUMENTS

2016/0042315 A1\* 2/2016 Field-Darragh ... G06Q 30/0282
  705/28
2017/0178221 A1\* 6/2017 Mccorry ............... G06Q 50/01
2019/0236531 A1\* 8/2019 Adato ................ G06Q 10/0633

\* cited by examiner

PREDICTIVE INVENTORY AVAILABILITY

BACKGROUND

This disclosure relates generally to a process for predicting inventory availability in a delivery system. In some embodiments, a shopper or "picker" is directed to warehouse location based on a predicted inventory availability.

In current delivery systems, shoppers, or "pickers," fulfill orders at a physical warehouse, such as a retailer, on behalf of customers as part of an online shopping concierge service. In current delivery systems, the pickers may be sent to various warehouse locations with instructions to fulfill orders for items, and the pickers then find the items included in the customer order in the warehouse. However, in conventional delivery systems, it is difficult to know before a picker arrives at the warehouse if the item in the customer's order is in stock at the location. Item inventory may fluctuate throughout a day or week, such that even if a picker previously found an item at a warehouse, the picker may be unable to find it at the same warehouse for a subsequent delivery order. The picker may then spend unnecessary time looking for an item that is not actually available. Furthermore, if the item is unavailable and the customer has already ordered it, the customer may become frustrated. If item inventory could be predicted, this could reduce the time spent by pickers looking for items that are not available, and customer satisfaction with the delivery system could be improved.

SUMMARY

As described herein, a delivery system can generate and use a machine-learned model to predict item availability of items included in a delivery order and selected by a customer. The machine-learned model is trained using information about items and whether or not the items were found at a warehouse location in previous delivery orders. The previous delivery orders make up large scale training datasets that are used to statistically map item characteristics, delivery order information, and other factors to item availability within the machine-learned model. Item information from new delivery orders is then input into the machine-learned model to generate item availability probabilities. Based on the availability predictions from the machine-learned model, instructions are generated to a picker who fulfills a delivery order. The instructions may reduce the amount of time that a picker spends looking for an item at a warehouse by telling the picker that an item is likely to be available or unavailable, and instructing the picker to continue or stop looking for an item based on the predicted availability. In other cases, the delivery system may provide availability information based on the availability predictions to customers; for example, the customer may be informed that an item is likely unavailable and provided with alternative options, which may preempt customer selection of unavailable items and a picker looking for unavailable items included in an order. In general, providing a prediction of item availability can improve customer satisfaction and reduce time spent by a picker searching for items.

A method for predicting inventory availability at a delivery system includes receiving a delivery order that includes a plurality of items and a delivery location. The delivery system identifies a warehouse for picking the plurality of items based on the plurality of items and the delivery location. The delivery system retrieves a machine-learned model that predicts a probability that an item is available at the warehouse. The model is trained, using machine learning, based in part on a plurality of datasets. The plurality of datasets include data describing items included in previous delivery orders, whether each item in each previous delivery order was picked, a warehouse associated with the previous delivery orders, and a plurality of characteristics associated with each of the items. The delivery system predicts, using the model, the probability that one of the plurality of items in the delivery order is available at the warehouse. The delivery system generates an instruction to a picker based on the probability, and transmits the instruction to a mobile device of the picker.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
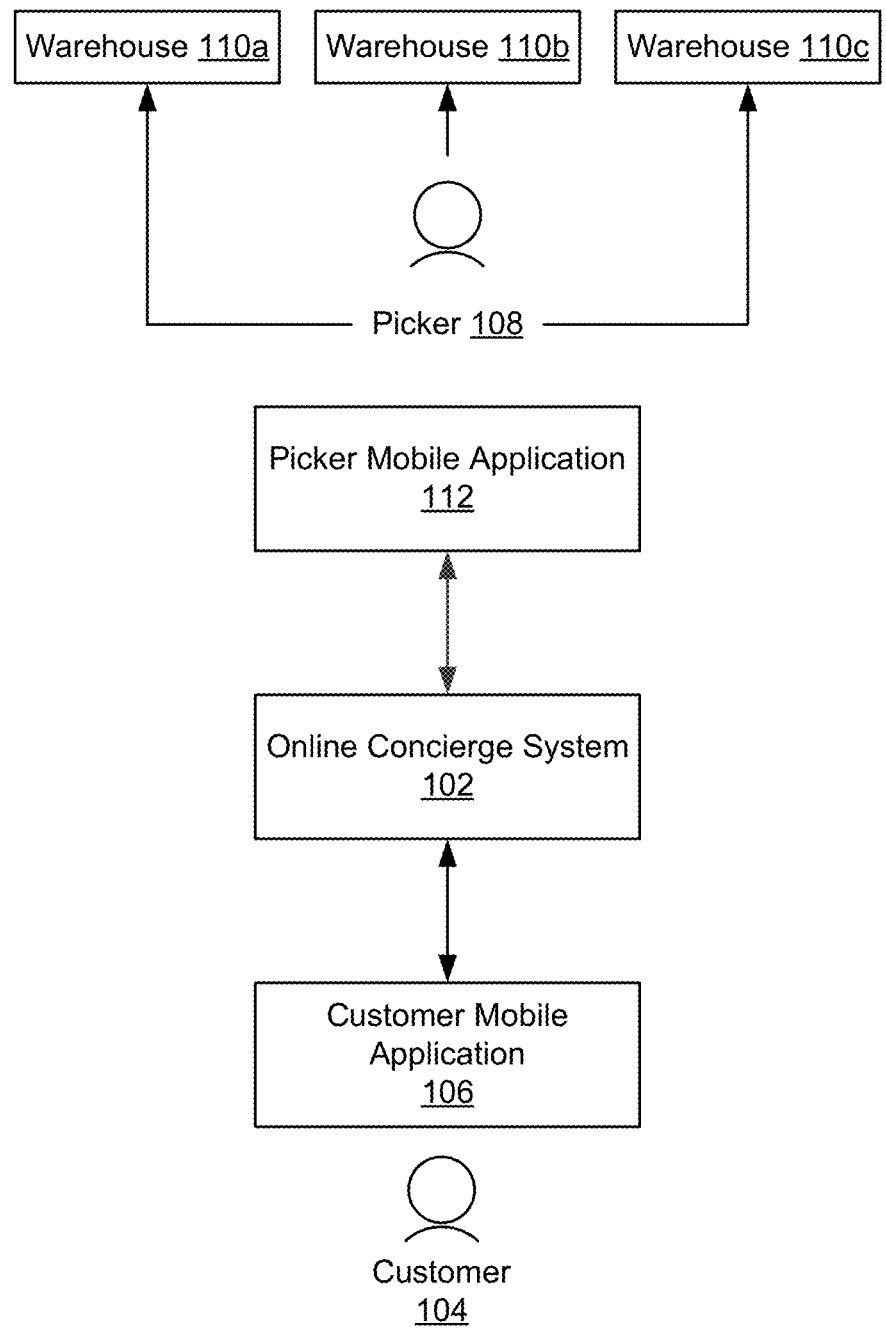
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more picker 108. A picker 108 may be a contractor, employee, or other person (or entity) who is enabled to fulfill orders received by the online concierge system 102. The picker 108 travels between a warehouse and a delivery location (e.g., the customer's home or office). A picker 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each picker 108 fulfills an order received from the online concierge system 102 at one or more warehouses 110, delivers the order to the customer 104, or performs both fulfillment and delivery. In one embodiment, pickers 108 make use of a picker mobile application 112 which is configured to interact with the online concierge system 102.

Figure 2:
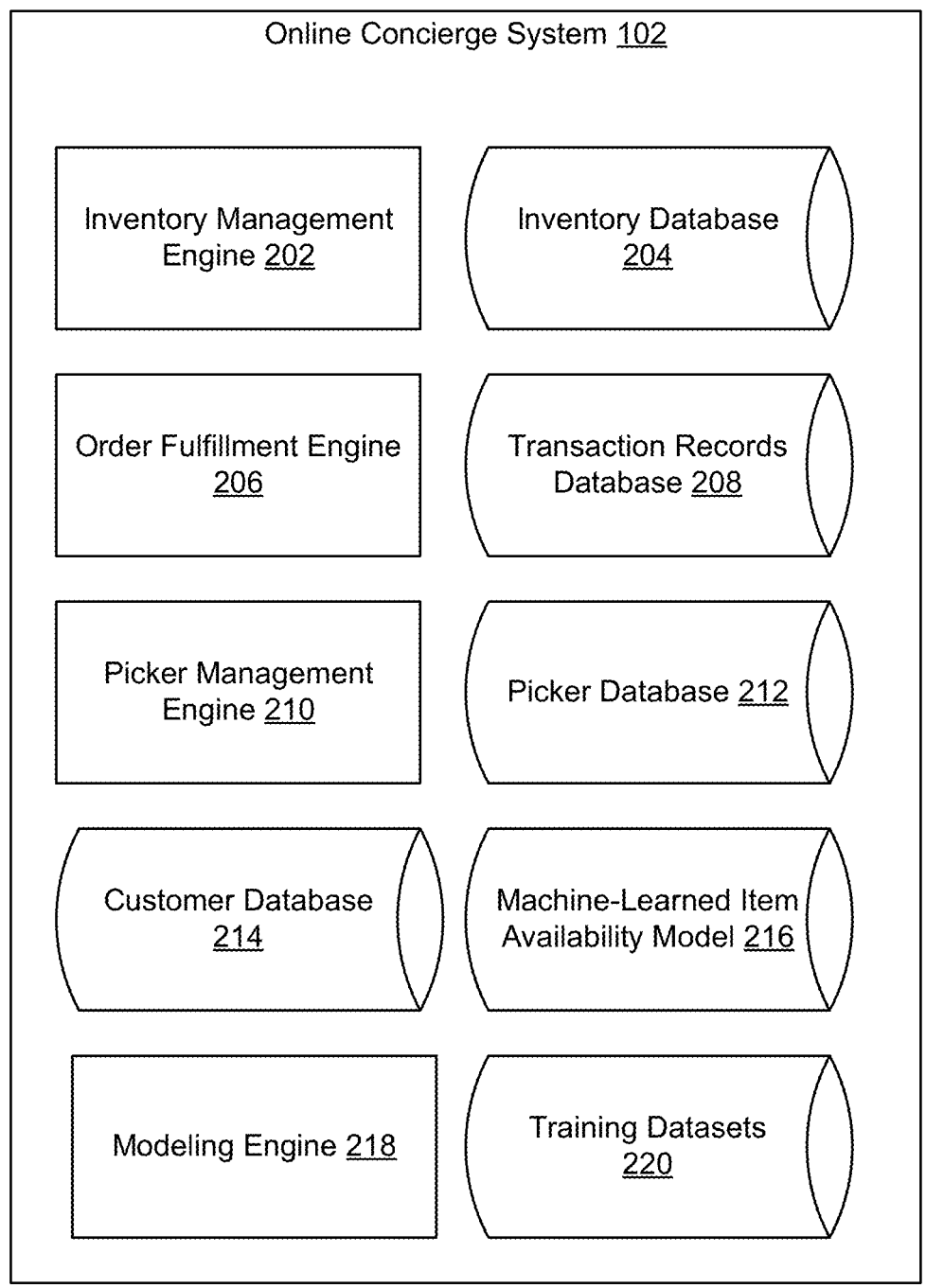
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a picker looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and pickers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The picker management engine 210 then identifies one or more appropriate pickers 108 to fulfill the order based on one or more parameters, such as the pickers' proximity to the appropriate warehouse 110 (and/or to the customer 104), his/her familiarity level with that particular warehouse 110, and so on. Additionally, the picker management engine 210 accesses a picker database 212 which stores information describing each picker 108, such as his/her name, gender, rating, previous shopping history, and so on. Methods that can be used to identify a warehouse 110 at which a picker 108 can likely find most or all items in an order are described with respect to FIGS. 4-7.

As part of fulfilling an order, the order fulfillment engine 206 and/or picker management engine 210 may access a customer database 214 which stores information describing each customer. This information could include each customer's name, address, gender, shopping preferences, favorite items, stored payment instruments, and so on.

Machine Learning Model

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or picker management engine 210 can use the machine-learned item availability model 216 to determine a probability that an item is available at a warehouse 110. The machine-learned item availability model 216 may be used to predict item availability for items being displayed to or selected by a customer, or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various item characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database, and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability that is generic enough to apply to any number of different item-warehouse pairs. In some embodiments, the probability output by the machine-learned item availability model 216 includes a confidence score. The confidence score may be the error or uncertainty score of the output availability probability, and may be calculated using any standard statistical error measurement. In some examples, the confidence score is based in part on whether the item-warehouse pair availability prediction was accurate for previous delivery orders (e.g., if the item was predicted to be available at the warehouse and not found by the picker, or predicted to be unavailable but found by the picker). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or picker 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, pickers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally or alternatively, the training datasets 220 include a day of the week previous delivery orders were placed. The day of the week may impact item availability, since popular shopping days may have reduced inventory of items, or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked, and is available for subsequent delivery orders. In some examples, training datasets 220 may also include a rate at which an item is typically found by a picker at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a picker was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from pickers 108, as described in further detail with reference to FIG. 5. Following updating of the training datasets 220, a modeling engine 218 may retrain a model with the updated training datasets 220, and produce a new machine-learned item availability model 216.

Customer Mobile Application

Figure 3A:
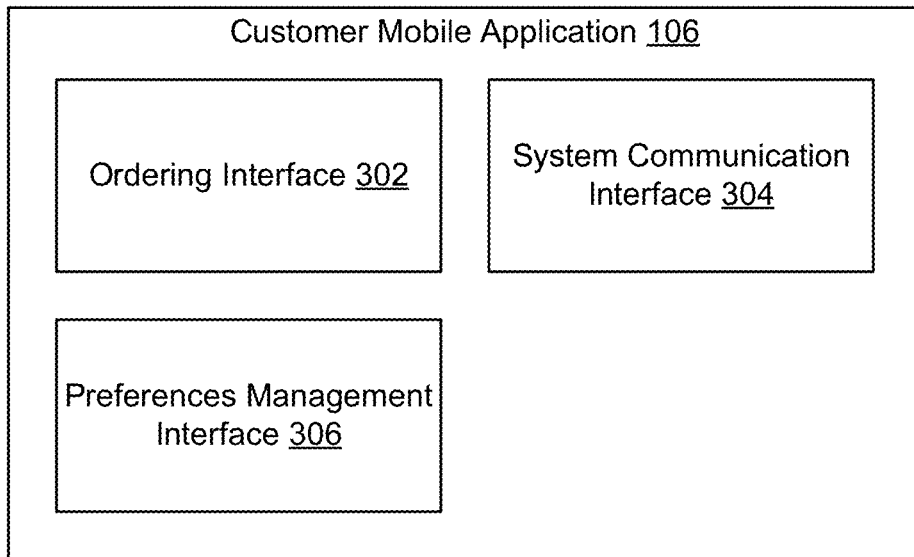
FIG. 3A is a diagram of a customer mobile application (CMA) 106, according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Picker Mobile Application

Figure 3B:
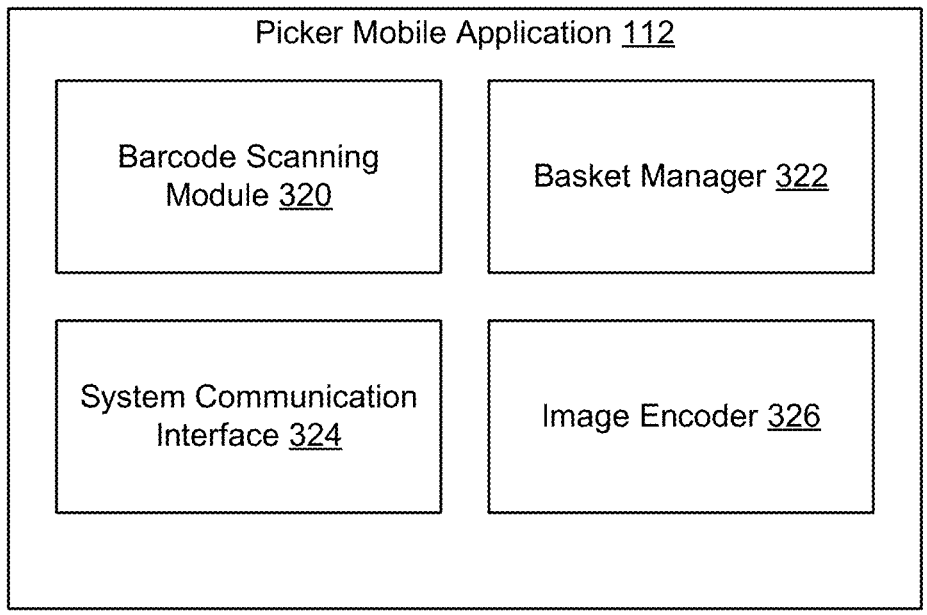
FIG. 3B is a diagram of a picker mobile application (PMA) 112, according to one embodiment.

FIG. 3B is a diagram of the picker mobile application (PMA) 112, according to one embodiment. The PMA 112 includes a barcode scanning module 320 which allows a picker 108 to scan an item at a warehouse 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. PMA 112 also includes a basket manager 322 which maintains a running record of items collected by the picker 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The PMA 112 also includes a system communication interface 324 which interacts with the online shopping concierge system 102. For example, the system communication interface 324 receives an order from the system 102 and transmits the contents of a basket of items to the system 102. The PMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
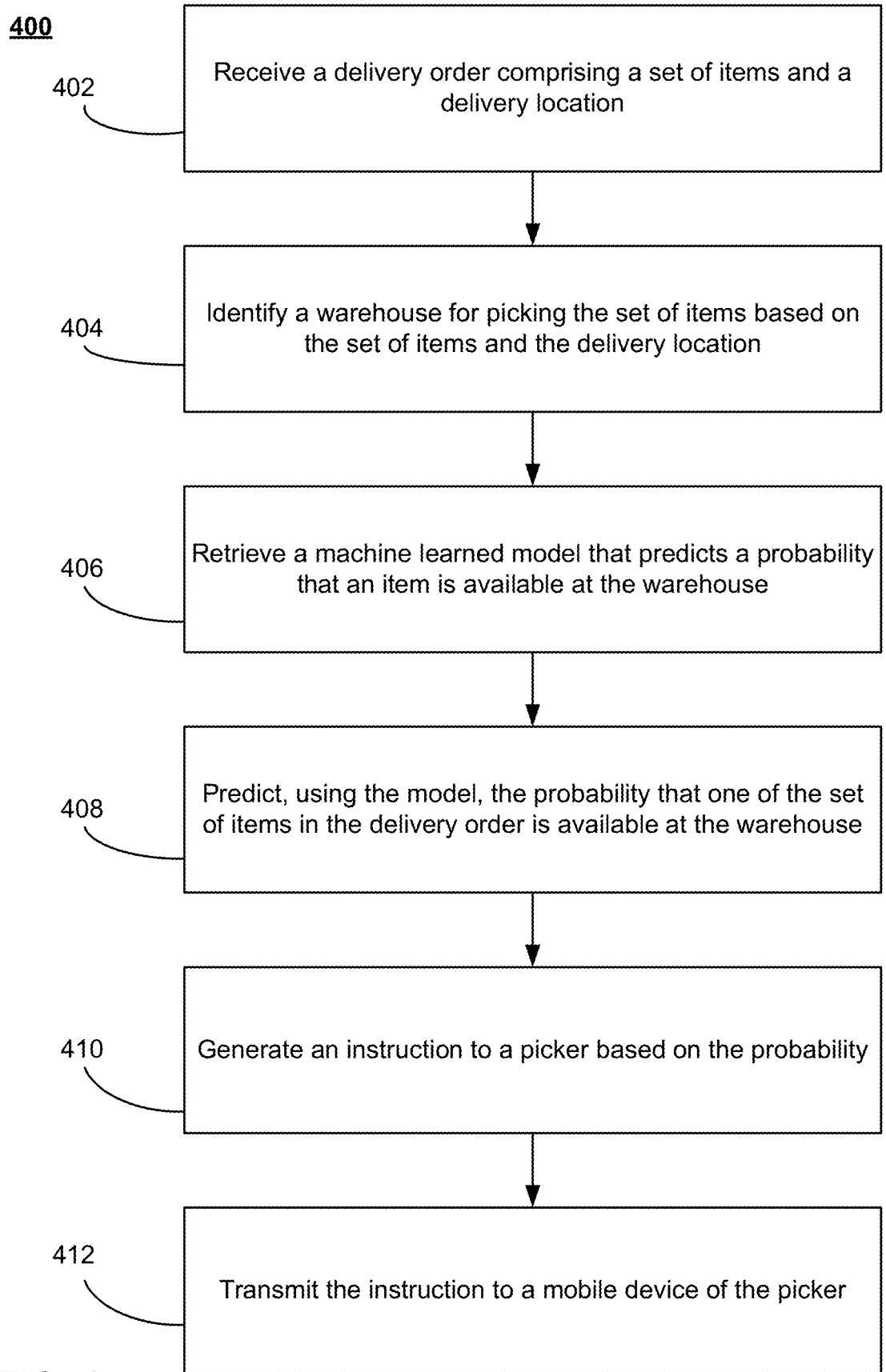
FIG. 4 is a flowchart illustrating a process for predicting inventory availability, according to one embodiment.

As described with reference to FIG. 2, the machine-learned item availability model 216 of the online concierge system 102 can determine an availability of an item requested by the customer 104. FIG. 4 is a flowchart illustrating a process 400 for predicting inventory availability, according to one embodiment. The online concierge system 102 receives 402 a delivery order that includes a set of items and a delivery location. The delivery location may be any location associated with a customer, such as a customer's home or office. The delivery location may be stored with the customer location in the customer database 214. Based on the delivery order, the online concierge system 102 identifies a warehouse 404 for picking the set of items in the delivery order based on the set of items and the delivery location. In some cases, the customer specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouse locations stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a picker. The order fulfillment engine 206 transmits the instruction to the picker through the PMA 112 via the picker management engine 210. The instruction is based on the predicted probability. In some examples, the picker management engine 210 instructs the picker to pick an item in the delivery order at a warehouse with the highest item availability score. For example, if a warehouse is more likely to have more items in the delivery order available than another warehouse, then the picker management engine 210 instructs the picker to pick the item at the warehouse with better availability. Other examples of the picker management engine 210 instruction to the picker are described in further detail with reference to FIGS. 5-6. In some other examples, the order fulfillment engine 206 sends a message and/or instruction to a customer based on the probability predicted by the machine-learned item availability model 216. This is described in further detail with reference to FIG. 7.

Updating the Training Datasets

Figure 5:
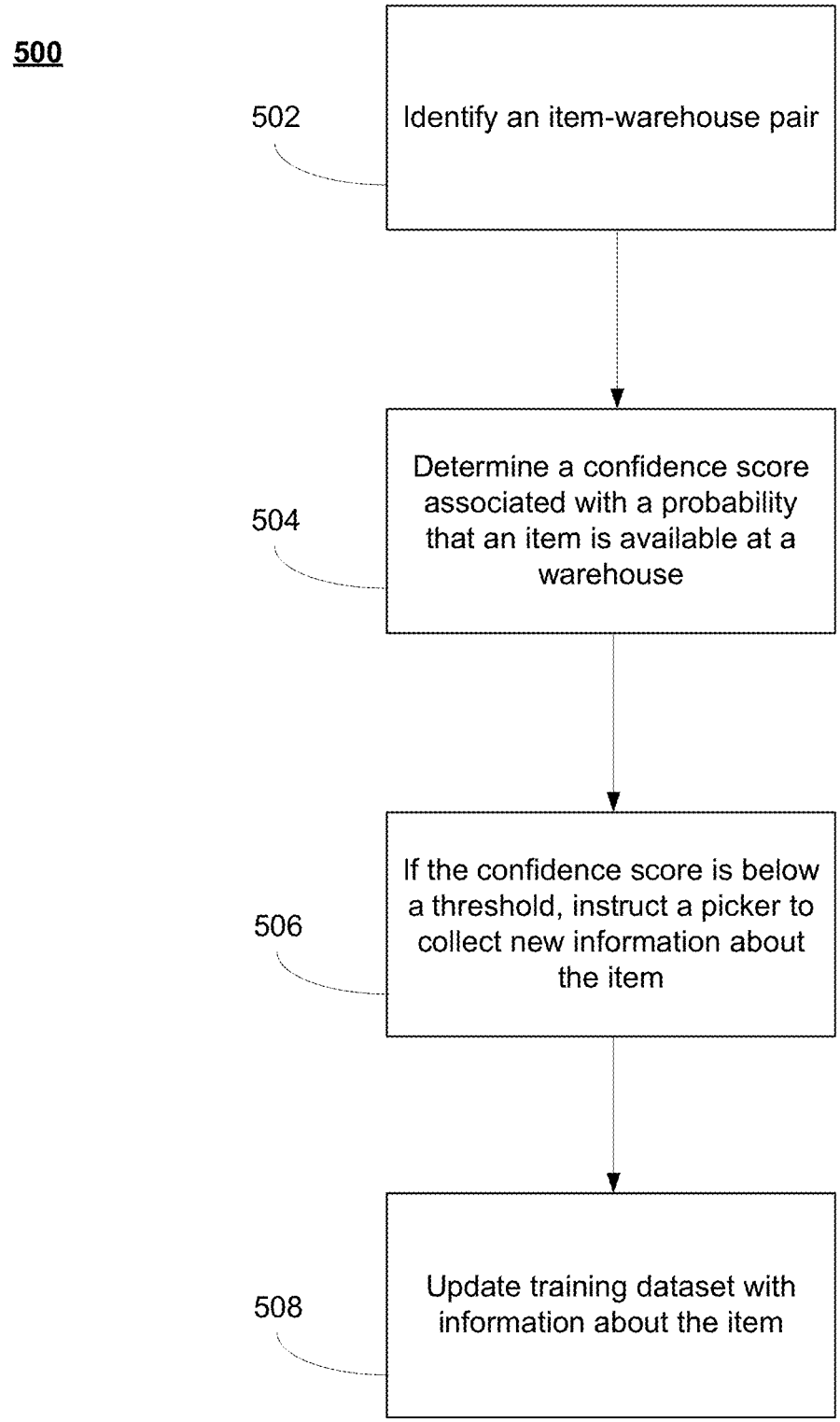
FIG. 5 is a flowchart illustrating a process for updating training datasets for a machine-learned model, according to one embodiment.

FIG. 5 is a flowchart illustrating a process 500 for updating training datasets for a machine-learned model, according to one embodiment. The training datasets may be the training datasets 220 as shown in FIG. 2. While the training datasets 220 include large datasets of information collected from previous delivery orders (e.g., information identifying items and whether or not the items were available at a warehouse), certain items or warehouses might have less information associated with them in the training datasets 220 than other items or warehouses. For example, if an item is not frequently ordered, or has not been ordered for a long period of time, then it may be more difficult to build an accurate availability prediction in the machine-learned item availability model 216. One way to improve the ability of the machine-learned item availability model 216 to accurately predict item availability is to increase the information about the item in the training datasets 220, and add new information. With larger and/or more recent datasets on the item, the modeling engine 218 can build more statistically meaningful connections between the machine-learning factors described with reference to FIG. 2 and the predicted item availability.

Process 500 thus improves the machine-learned item availability model 216 by increasing the datasets for particular items in the training datasets 220 with low confidence scores. Process 500 may be carried out by the online concierge system 102, e.g., by the inventory management engine 202 in conjunction with the picker management engine 210, the item availability model 216, and the modeling engine 218. In some examples, process 500 is carried out by the online concierge system 102 following retrieving 406 a machine-learned model that predicts a probability that an item is available at a warehouse, as described in FIG. 4.

The online concierge system 102 (e.g., the inventory management engine 202 using the item availability model 216) identifies 502 an item-warehouse pair. For example, the item and warehouse in the item-warehouse pair may be an item in a received order and warehouse or potential warehouse for picking the items from the received order, e.g., to evaluate the suitability of the warehouse or likelihood of successfully picking the order before the order is picked.

As another example, the item-warehouse pair may be identified from items for which the availability predicted by the machine-learned item availability model 216 was incorrect (e.g., the item was predicted to be available and was determined by the picker to be out of stock, or the item was predicted to be unavailable and the picker was able to find it in the warehouse). For items for which the availability prediction was incorrect, the online concierge system 102 may determine if the items have sufficient associated information within the training datasets 220. If the online concierge system 102 determines that the incorrect probability was a result of insufficient or stale information in the training datasets 220, it may identify item-warehouse pairs and carry out process 500 to update the training datasets 220.

Additionally or alternatively, item-warehouse pairs are identified from new items offered by the online concierge system 102. For new items, there may not be previous delivery order information relating the item availability to item characteristics, delivery order information, or time information in the training datasets 220. The lack of previous delivery orders may lead to a low confidence score for new items. The inventory management engine 202 may initiate the process 500 for new items until sufficient information about the items are collected in the training datasets 220 to improve the item availability confidence score associated with the items.

The online concierge system 102 (e.g., the inventory management engine 202 using the machine-learned item availability model 216) inputs the item, warehouse, and timing characteristics for the identified item-warehouse pair into the machine-learned item availability model 216 and determines 504 a confidence score associated with a probability that an item is available at the warehouse. The online concierge system 102 may determine probabilities and/or confidence scores for all or selected items in an inventory, e.g., items that are expected to be picked based on already-received orders, sales, promotions, holidays, weather, historical trends, or other factors. The confidence score is generated along with the item availability probability by the machine-learned item availability model 216. The confidence score may be an error associated with the availability probability. The confidence score indicates items that may not have enough training data in the training datasets 220 to generate a statistically significant link between the item's availability and information from the delivery order and/or item characteristics. In some alternate embodiments, the online concierge system 102 may identify, using the item availability model 216, item-warehouse pairs with a low confidence score, e.g., all item-warehouse pairs with a confidence score below a particular threshold. This list of item-warehouse pairs may be filtered, e.g., based on item popularity, predicted items to be ordered, warehouse, or one or more other factors.

In response to the determined confidence level of an item-warehouse pair being below a threshold, the online concierge system 102 (e.g., the picker management engine 210) instructs 506 the picker to collect new information about items with a confidence score below a threshold. A confidence score threshold may be an item availability probability between 0 and 1. A threshold confidence score may be 0.3, such that in response to a confidence score below 0.3, the picker is instructed to collect new information about an item. In some embodiments, the online concierge system 102 also considers the availability probability for the item-warehouse pair. For example, if an item-warehouse pair has a confidence level slightly below the threshold, but a very low or very high availability probability, the online concierge system 102 may determine not to collect new information about the item-warehouse pair. In some embodiments, the threshold used for the confidence score may depend on the availability probability, or vice versa.

In response to the instruction, the picker 108 determines whether the item is available at the warehouse. The picker may be instructed to try to find the item at the warehouse, and indicate, through the PMA 112, whether the item is available. This information is transmitted to the online concierge system 102 via the picker management engine 210, and used to update 508 the training datasets 220. In some embodiments, a picker may be given a list of items with low confidence scores to seek within the warehouse. The online concierge system 102 updates 508 the training dataset 220 with new information about the item, which includes whether or not the item is available in the warehouse, and any additional item characteristics, warehouse information, or time information as described with respect to FIG. 2. The online concierge system 102 also updates the inventory database 204 based on the received information; e.g., if the inventory database 204 stores the time at which the item was most recently found or not found, this time will be updated based on the input from the picker 108. In response to the new information collected by the picker, the modeling engine 218 may update or retrain the machine learning item availability model 216 with the updated training datasets 220. Process 500 may be carried out by the online concierge system 102 until a confidence score associated with a probability that an item is available is above a threshold.

Use Case Examples

An example of process 500 used in conjunction with process 400 is described below. The online concierge system 102 receives 402 a delivery order from a customer 104 through the CMA 106. The customer 104 schedules a delivery at their home of three items to be delivered the following day. As an example, the customer 104 may order grated mozzarella, pizza dough, and tomato sauce, each of which is included in the delivery order. The online concierge system 102 sends the delivery order to the order fulfillment engine 206. The order fulfillment engine 206 uses the inventory management engine 202 and customer database 214 to identify 404 a warehouse for picking the requested items based on the items and the delivery location (i.e., the customer's home). A number of possible warehouses may be identified. For each possible warehouse, the order fulfillment engine 206 identifies 502 an item-warehouse pair with one of the items in the delivery order. Thus a set of item-warehouse pairs is identified for each of the grated mozzarella, pizza dough and tomato sauce. The online concierge system 102 retrieves 406 the machine-learned item availability model 216 that predicts a probability that an item is available at the warehouse. The online concierge system 102 inputs the item, warehouse, and timing characteristics for each of the identified item-warehouse pairs into the machine-learned item availability model 216. The machine-learned item availability model 216 predicts 408 the probability that each of the grated mozzarella, pizza dough and tomato sauce are available at the identified warehouses. For each of the availability probabilities, the online concierge system 102 also determines 504 a confidence score associated with the probability from the machine-learned item availability model 216.

It is possible that the confidence score for pizza dough confidence score at one or more of the warehouses is below a threshold, given that people frequently make their own pizza dough and it may not be frequently ordered. Thus pizza dough may have a relatively small and/or old associated dataset in the training dataset 220, leading to a low confidence score on the pizza dough availability probability within the machine-learned item availability model 216. The online concierge system 102, using the picker management engine 210, instructs 506 a picker to collect new information about pizza dough at one or more of the warehouses. The picker management engine 210 may identify an off-duty picker, or a picker already at one of the warehouses identified 502 in an item-warehouse pair to collect information about whether or not pizza dough is available at the warehouse. The picker management engine 210 transmits this instruction through the PMA 112. The picker 108 may find that pizza dough is in fact available, and transmit the availability to the online concierge system 102 through the PMA 112. This new information is used to update 508 the training dataset 220 and the inventory database 204. The picker management engine 210 may transmit the same instruction to multiple pickers 108 at different warehouses, or at different times, such that there is a larger set of data about pizza dough availability added to the training dataset 220, and more recent data in the inventory database 204.

In this example, the modeling engine 218 uses the updated training datasets 220 to retrain the machine-learned item availability model 216. The online concierge system 102 then re-inputs the pizza dough-warehouse pairs into the updated machine-learned item availability model 216 and determines 504 a confidence score associated with the probability that pizza dough is available at a number of possible warehouses. It is possible that the confidence scores are now above a threshold, because the increased data about pizza dough added to the training datasets 220 has improved the machine-learned item availability model 216, and/or the newer data in the inventory database 204 has improved the confidence score. The online concierge system 102 then generates 410 an instruction to a picker 108 based on the availability probabilities for pizza dough. The instruction may be to pick the pizza dough at the warehouse with the highest availability probability. In other examples, the instruction may be to pick the pizza dough, grated mozzarella and tomato sauce at a warehouse with the highest availability probability for all of these items in the customer's delivery order. The online concierge system 102 transmits the instruction to a mobile device of the picker 108.

Additionally or alternatively, the online concierge system 102 may use the machine-learned item availability model 216 to predict an anticipated demand for an item at a warehouse. The online concierge system 102 may compare the number of times an item is included in a set of delivery orders to the item availability predictions generated by the machine-learned item availability model 216, and identify items that are frequently ordered but have low corresponding availability probabilities. For example, around the holidays, there may be an increase in delivery orders including Brussels sprouts, whereas Brussels sprouts may have a low availability prediction since they are not typically stocked in large quantities. The online concierge system may identify the discrepancy between a large volume of item orders and the low availability probability and convey this information to a warehouse 110. Additionally or alternatively, the online concierge system 102 may transmit information about items that have availability predictions below a threshold.

Instructions to Picker

Figure 6:
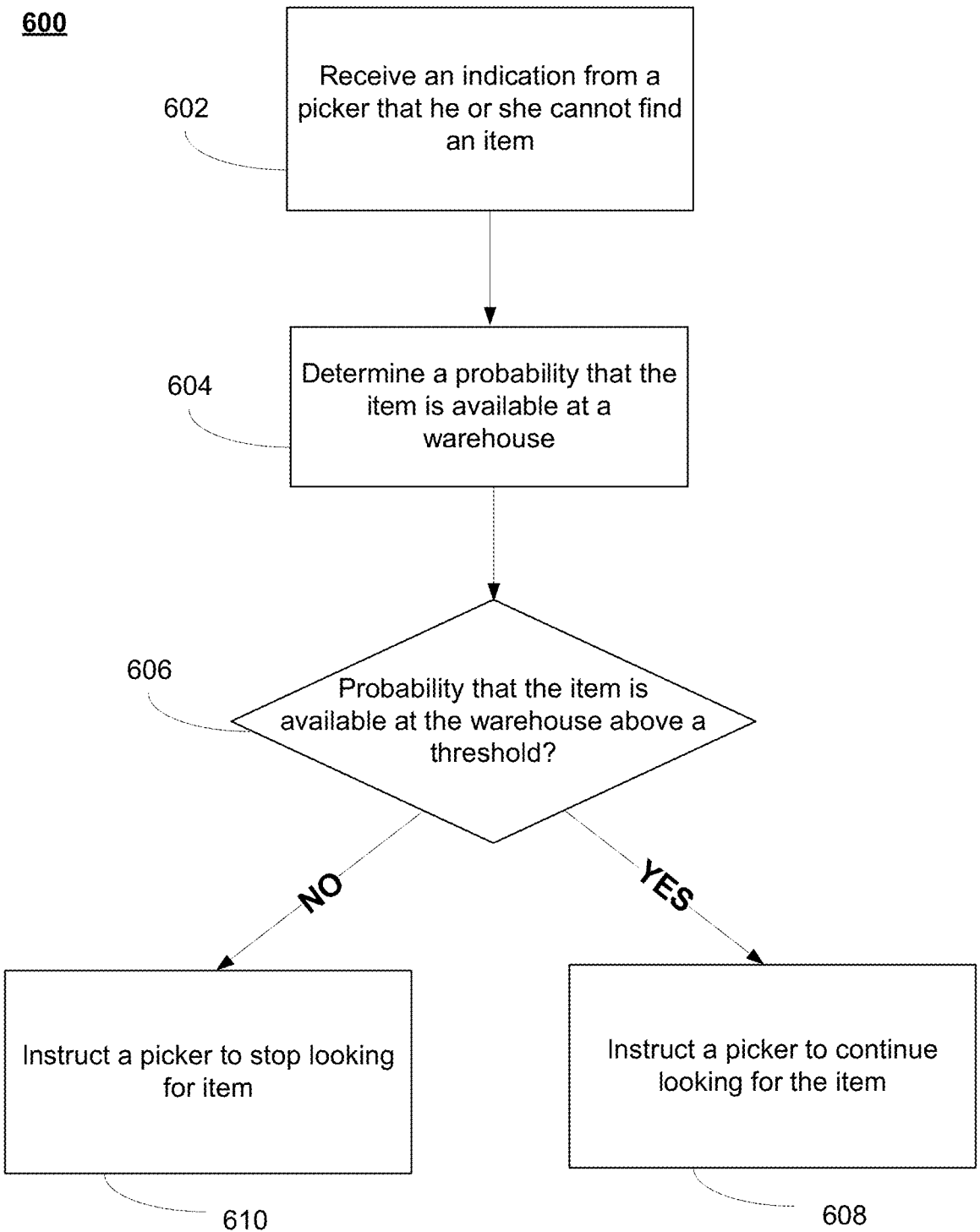
FIG. 6 is a flowchart illustrating a process for determining instructions to a picker if a probability indicates that an item is available at a warehouse, according to one embodiment.

FIG. 6 is a flowchart illustrating a process 600 for determining instructions to a picker if a probability indicates that an item is available at a warehouse, according to one embodiment. Process 600 may be used to assist a picker looking for an item in a delivery order at a warehouse, and may therefore reduce the time a picker spends looking for items that are not actually available at a warehouse. Process 600 may be carried out by the online concierge system 102.

The online concierge system 102 (e.g., the picker management engine 210) receives an indication 602 from a picker that he or she cannot find an item at the warehouse. The picker may transmit this information to the online concierge system 102 through the PMA 112, which communicates it to the picker management engine 210. The picker may input the item information into the PMA 112. In some examples, the picker may also provide additional information about where they have already looked for the item within the warehouse, such as aisles in which the item was not found, departments in which the item was not found, the amount of time he or she spent looking for the item, etc. In response, the online concierge system 102 inputs the item, warehouse, and timing characteristics for the item received from the picker and the warehouse in which the picker is unable to find the item into the machine-learned item availability model 216 with. In some embodiments, the online concierge system 102 may incorporate the information provided by the picker through the PMA 112 into the training datasets 220, which may be later used by the modeling engine 218 to update the machine-learned item availability model 216. The online concierge system 102 determines 604 a probability that the item is available at the warehouse from the probability output by the machine-learned item availability model 216. The online concierge system 102 then compares the output probability against a threshold and determines 606 if the item availability probability is above the threshold. In some examples, this threshold value may be an item availability probability of 0.3. Additionally or alternatively, the online concierge system 102 may compare a confidence score associated with the item availability probability to a threshold value.

If an availability probability is above the threshold, this indicates that the item is predicted to be available at the warehouse. The picker management engine 210 then instructs 608 a picker to continue looking for the item. The instruction may be transmitted to the picker through the PMA 112. In some examples, the instruction may be accompanied by information as to a location within the warehouse that the item is most likely to be available, such as an aisle of the warehouse and/or a department.

If the probability that the item is available is below a threshold value, then the picker management engine 210 instructs 610 the picker to stop looking for the item. The picker management engine 210 may transmit the instruction through the PMA 112. The picker management engine 210 may add the item-warehouse pair and any associated time or item information to the training dataset 220 indicating that the item was not found at the warehouse. The picker management engine 210 may then instruct the picker to look for the next item in a delivery order, or for a replacement item that has a high availability probability.

In some examples, the online concierge system 102 may determine 604 a probability that an item is available at a warehouse and compare 606 the availability probability to a threshold before receiving an indication 602 from a picker that he or she cannot find an item. For example, the inventory management engine 202 may determine item availability probabilities for all items within a delivery order transmitted to a picker. If the probability indicates that an item should be available, the online concierge system 102 may provide this information to the picker through the PMA 112. If the probability indicates that an item might be unavailable, the online concierge system 102 may transmit a warning or other indication to the picker that the item might be unavailable. In some examples, if the item probability indicates that an item is unavailable, the PMA 112 may instruct the picker to limit the amount of time the picker looks for the item in the warehouse, and/or to pick a replacement item. In some examples, the item availability probabilities provided to the picker may include location information, such as where in a warehouse the item is most likely to be located, such as an aisle or department.

Feedback to Customer

Figure 7:
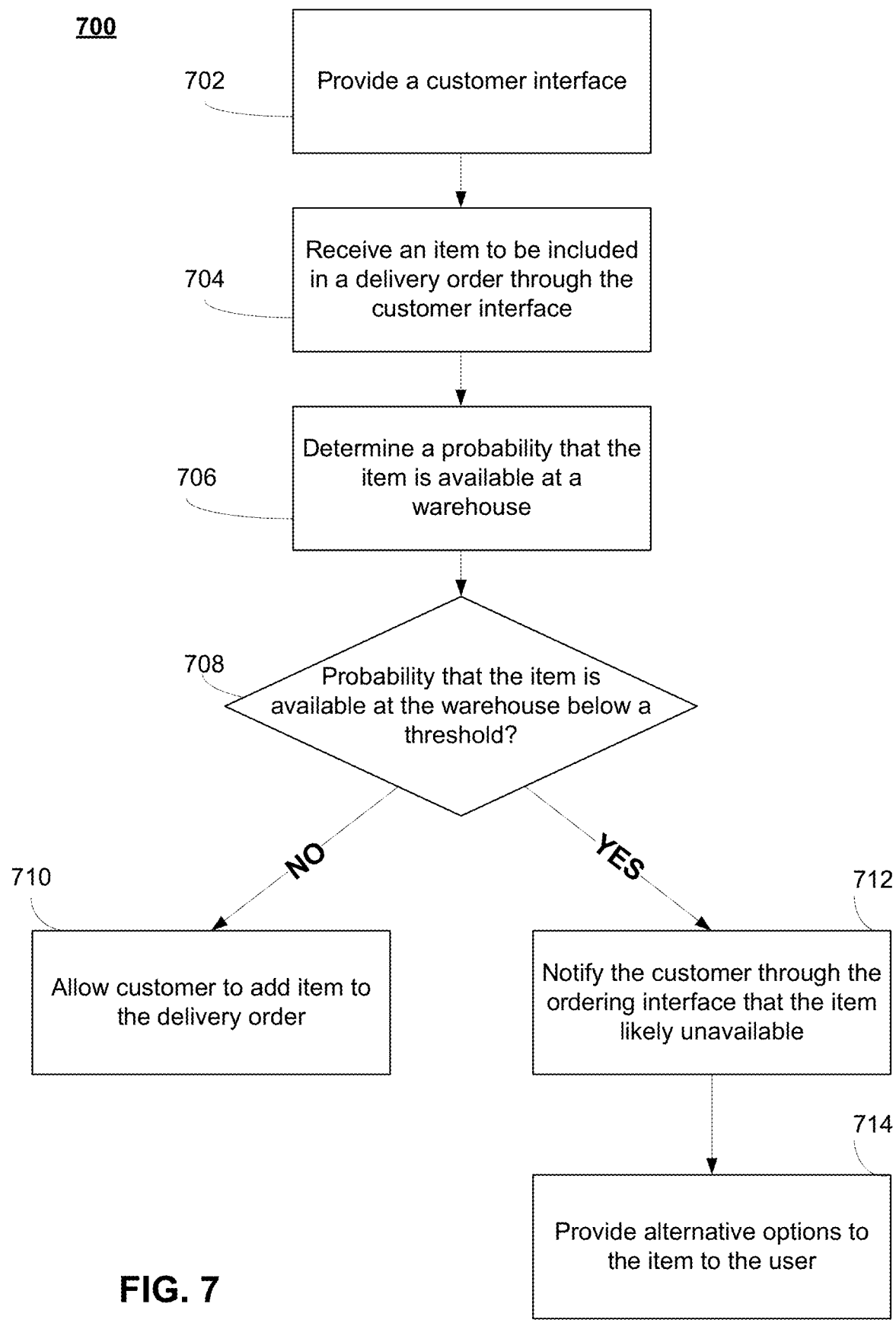
FIG. 7 is a flowchart illustrating a process for determining feedback to a customer based on a probability that an item is available at a warehouse, according to one embodiment.

FIG. 7 is a flowchart illustrating a process 700 for determining feedback to a customer based on a probability that an item is available at a warehouse, according to one embodiment. Process 700 may be carried out by the online concierge system 102 (e.g., the order fulfillment engine 206) communicating with a customer via the CMA 106. The order fulfillment engine 206 provides a customer interface 702. The customer interface includes an ordering interface through which a customer may make item selections, and add items to a delivery order. The customer interface may be an interface of the CMA 106, such as the ordering interface 302 as described in FIG. 3A. The customer interface receives 704 an item to be included in a delivery order. This item may be any item selected for purchase by the customer through the customer interface. The customer may also provide a delivery time associated with the order, which the online concierge system 102 can use to determine or approximate a picking time for the order. In response to the customer inputs, the online concierge system 102 (e.g., the order fulfillment engine 206) determines 706 a probability that the item received at 704 is available at a warehouse, e.g., a warehouse selected by the customer, or a warehouse selected by the online concierge system 102 for fulfilling an order from the customer. The probability is determined by inputting the item, warehouse, and timing characteristics for the item received and the warehouse into a machine-learned item availability model 216. The machine-learned item availability model 216 then outputs a probability that the item is available at the warehouse.

The order fulfillment engine 206 then determines 708 if the probability an item is available at the warehouse is below a threshold. In some examples, this threshold is a probability between 0.1 and 0.3. In some examples, the probability may also include a confidence score as provided by the machine-learned item availability model 216, and order fulfillment engine 206 may also determine if the confidence score associated with the probability 706 is above a threshold. If the probability that an item is available is not below a threshold, then the order fulfillment engine 206 allows 710 a customer to add the item to the delivery order. This delivery order may then be transmitted to a picker through the PMA 112 to be picked at a warehouse.

If the probability that an item is available is below a threshold, then the order fulfillment engine 206 notifies the customer 712 through an ordering interface of the customer interface provided. The notification may be a warning or other message transmitted to the customer through the ordering interface. For example, the notification may be a message saying "item frequently not found" provided through the ordering interface. The ordering interface provides alternative options 714 to the item to the user. The alternative options may be items determined by the machine-learned item availability model 216 to be available. The alternative options 714 may be items of the same item type selected by the user that have high availability probabilities. For example, if process 700 receives an order for a specific brand of eggs 704, and the probability that the eggs are available at the warehouse is below a threshold 708, then the alternative options 714 may be other brands of the same kind of egg previously selected by the user (e.g., organic, brown, extra large, etc.) with high availability probabilities as determined by the machine-learned item availability model 216. The alternative options 714 may be ranked according to their availability probabilities. To encourage customers to select from the alternative options, a message may be included with the alternative options indicated that the item is likely available or was recently found at the warehouse.

In some examples, while the customer is notified 712 and provided with alternative options 714, the ordering interface may still allow the customer to add the item to the delivery order. The customer may instruct the picker to substitute the item received with the alternative options provided if the picker cannot find the item. In other examples, the ordering interface does not allow the customer to add the item received 704, and the customer chooses one of the alternative options 714 (or no item) to be added to the delivery order.

In some examples, if the online concierge system 102 frequently receives customer requests to add an item to a delivery order that is then determine to have an availability probability below a threshold, the online concierge system 102 may temporarily remove the item from the item options provided to a customer through the customer interface.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A method for predicting inventory availability, the method comprising:

receiving a delivery order comprising a plurality of items and a delivery location;

identifying a warehouse for picking the plurality of items based on the plurality of items and the delivery location;

training a machine-learned model on a set of training data, the set of training data describing items included in previous delivery orders, a warehouse associated with each previous delivery order, and a plurality of characteristics associated with each of the items, wherein the training comprises:

inputting factors for an item-warehouse pair into the machine-learned model, the item-warehouse pair corresponding to a specific item, wherein the machine-learned model generates a confidence score indicative of an accuracy of a prediction of availability of the specific item;

in response to the confidence score indicative of the accuracy of the prediction of availability of the specific item being below a threshold, sending instructions to a first mobile device of a first picker, the instructions comprising having the first picker to attempt to find the specific item and to collect new information about the item;

receiving, from the first mobile device, a result of the attempt to find the specific item and new information about the item;

updating the training data to include the new information, wherein the new information is used as the factors of the item-warehouse pair and wherein the result of the attempt to find the specific item is used to update the training data to include an indication of the availability of the specific item in the warehouse and a corresponding time of the result; and training the machine-learned model on the updated training data;

predicting, using the machine-learned model, a probability that one of the plurality of items in the delivery order is available at the warehouse;

generating an instruction to a second picker based on the probability; and transmitting the instruction to a second mobile device of the second picker.

2. The method of claim 1, further comprising:
updating the training data at a periodic interval; and
retraining the machine-learned model based on updated training data.

3. The method of claim 1, wherein the training data further comprises data identifying, for each previously-picked delivery order, a time associated with the previously-picked delivery order, and wherein the time comprises at least one of: a time of day the delivery order is picked, a day of a week the delivery order is picked, a time interval since the item was picked in a previously-picked delivery order, and a time interval since the item was not found in a previous delivery order.

4. The method of claim 1, wherein the plurality of characteristics associated with an item comprises at least one of: a department associated with the item, an aisle of the warehouse associated with the item, an item popularity score, a product type associated with the item, a time interval since the item was found, and a time interval since the item was not found.

5. The method of claim 1, wherein generating the instruction to the second picker based on the probability comprises:
receiving an indication from the second picker that the second picker cannot find the item;

determining that the probability for an item of the plurality of items in the delivery order is above a threshold that indicates that the item is available at the warehouse;
instructing the second picker to continue looking for the item.

6. The method of claim 5, further comprising:
providing a location within the warehouse that the item is most likely available.

7. The method of claim 1, further comprising:
generating a warning to a user associated with the delivery order if the probability is below a threshold value.

8. The method of claim 1, wherein the warehouse is one of a plurality of potential warehouses, and the warehouse is selected from the plurality of potential warehouses based on the probability that one of the plurality of items in the delivery order is available at the warehouse.

9. A non-transitory computer-readable storage medium storing instructions for predicting inventory availability, wherein the instructions, when executed by a processor, cause the processor to:

receive a delivery order comprising a plurality of items and a delivery location;

identify a warehouse for picking the plurality of items based on the plurality of items and the delivery location;

train a machine-learned model on a set of training data, the set of training data describing items included in previous delivery orders, a warehouse associated with each previous delivery order, and a plurality of characteristics associated with each of the items, wherein the training comprises:

input factors for an item-warehouse pair into the machine-learned model, the item-warehouse pair corresponding to a specific item, wherein the machine-learned model generates a confidence score indicative of an accuracy of a prediction of availability of the specific item;

in response to the confidence score indicative of the accuracy of the prediction of availability of the specific item being below a threshold, send instructions to a first mobile device of a first picker, the instructions comprising having the first picker to attempt to find the specific item and to collect new information about the item;

receive, from the first mobile device, a result of the attempt to find the specific item and new information about the item;

update the training data to include the new information, wherein the new information is used as the factors of the item-warehouse pair and wherein the result of the attempt to find the specific item is used to update the training data to include an indication of the availability of the specific item in the warehouse and a corresponding time of the result; and train the machine-learned model on the updated training data;

predict, using the machine-learned model, a probability that one of the plurality of items in the delivery order is available at the warehouse;

generate an instruction to a second picker based on the probability; and transmit the instruction to a second mobile device of the second picker.

10. The computer-readable storage medium of claim 9, wherein the instructions, when executed, further cause the processor to:

update the training data at a periodic interval; and retrain the machine-learned model based on updated training data.

11. The computer-readable storage medium of claim 9, wherein the training data further comprises data identifying, for each previously-picked delivery order, a time associated with the previously-picked delivery order, and wherein the time comprises at least one of: a time of day the delivery order is picked, a day of a week the delivery order is picked, a time interval since the item was picked in a previously-picked delivery order, and a time interval since the item was not found in a previous delivery order.

12. The computer-readable storage medium of claim 9, wherein the plurality of characteristics associated with an item comprises at least one of: a department associated with the item, an aisle of the warehouse associated with the item, an item popularity score, a product type associated with the item, a time interval since the item was found, and a time interval since the item was not found.

13. The computer-readable storage medium of claim 9, wherein generate the instruction to the second picker based on the probability comprises:

receive an indication from the second picker that the second picker cannot find the item;

determine that the probability for an item of the plurality of items in the delivery order is above a threshold that indicates that the item is available at the warehouse; and instruct the second picker to continue looking for the item.

14. The computer-readable storage medium of claim 13, wherein the instructions, when executed, further cause the processor to:

provide a location within the warehouse that the item is most likely available.

15. The computer-readable storage medium of claim 9, further comprising:

generate a warning to a user associated with the delivery order if the probability is below a threshold value.

16. The computer-readable storage medium of claim 9, wherein the warehouse is one of a plurality of potential warehouses, and the warehouse is selected from the plurality of potential warehouses based on the probability that one of the plurality of items in the delivery order is available at the warehouse.

17. A system comprising:

a processor; and memory configured to store instructions for predicting inventory availability, wherein the instructions, when executed by the processor, cause the processor to:

receive a delivery order comprising a plurality of items and a delivery location;

identify a warehouse for picking the plurality of items based on the plurality of items and the delivery location;

train a machine-learned model on a set of training data, the set of training data describing items included in previous delivery orders, a warehouse associated with each previous delivery order, and a plurality of characteristics associated with each of the items, wherein the training comprises:

input factors for an item-warehouse pair into the machine-learned model, the item-warehouse pair corresponding to a specific item, wherein the machine-learned model generates a confidence score indicative of an accuracy of a prediction of availability of the specific item;

in response to the confidence score indicative of the prediction of availability of the specific item being accurate being below a threshold, send instructions to a first mobile device of a first picker, the instructions comprising having the first picker to attempt to find the specific item and to collect new information about the item;

receive, from the first mobile device, a result of the attempt to find the specific item and new information about the item;

update the training data to include the new information, wherein the new information is used as the factors of the item-warehouse pair and wherein the result of the attempt to find the specific item is used to update the training data to include an indication of the availability of the specific item in the warehouse and a corresponding time of the result; and train the machine-learned model on the updated training data;

predict, using the machine-learned model, a probability that one of the plurality of items in the delivery order is available at the warehouse;

generate an instruction to a second picker based on the probability; and transmit the instruction to a second mobile device of the second picker.

18. The system of claim 17, wherein the instructions, when executed, further cause the processor to update the training data at a periodic interval; and retrain the machine-learned model based on updated training data.

19. The system of claim 17, wherein the training data further comprises data identifying, for each previously-picked delivery order, a time associated with the previously-picked delivery order, and wherein the time comprises at least one of: a time of day the delivery order is picked, a day of a week the delivery order is picked, a time interval since the item was picked in a previously-picked delivery order, and a time interval since the item was not found in a previous delivery order.

20. The system of claim 17, wherein the plurality of characteristics associated with an item comprises at least one of: a department associated with the item, an aisle of the warehouse associated with the item, an item popularity score, a product type associated with the item, a time interval since the item was found, and a time interval since the item was not found.

* * * * *